United States Patent
Ren et al.

(10) Patent No.: US 9,010,735 B2
(45) Date of Patent: Apr. 21, 2015

(54) CONTACT REACTION TOWER

(75) Inventors: Hongqiang Ren, Nanjing (CN); Ke Xu, Nanjing (CN); Lili Ding, Nanjing (CN); Xinkun Ren, Nanjing (CN); Yanru Wang, Nanjing (CN)

(73) Assignee: Nanjing University, Nanjing (CN)

( * ) Notice: Subject to any disclaimer, the term of this patent is extended or adjusted under 35 U.S.C. 154(b) by 478 days.

(21) Appl. No.: 13/474,774

(22) Filed: May 18, 2012

(65) Prior Publication Data

US 2012/0223447 A1    Sep. 6, 2012

Related U.S. Application Data

(63) Continuation-in-part of application No. PCT/CN2010/080498, filed on Dec. 30, 2010.

(51) Int. Cl.
*B01F 3/04* (2006.01)
*C02F 1/78* (2006.01)
*C02F 103/34* (2006.01)

(52) U.S. Cl.
CPC ............ *C02F 1/78* (2013.01); *C02F 2201/003* (2013.01); *C02F 2301/046* (2013.01); *C02F 2103/343* (2013.01); *C02F 2301/024* (2013.01)

(58) Field of Classification Search
USPC ................ 261/66, 74, 95, 96, 97, 110, 121.1, 261/122.1, 123, 125, 126, DIG. 72
See application file for complete search history.

(56) References Cited

U.S. PATENT DOCUMENTS

| | | | | | |
|---|---|---|---|---|---|
| 4,507,253 | A | * | 3/1985 | Wiesmann | 261/22 |
| 4,545,945 | A | * | 10/1985 | Prave et al. | 261/36.1 |
| 4,549,997 | A | * | 10/1985 | Verner et al. | 261/77 |
| 5,968,352 | A | * | 10/1999 | Ditzler | 210/220 |
| 6,036,863 | A | * | 3/2000 | Brockdorff | 210/616 |
| 6,096,203 | A | * | 8/2000 | Drewery | 210/170.06 |
| 7,488,413 | B2 | * | 2/2009 | Badreddine | 210/151 |
| 8,136,797 | B2 | * | 3/2012 | Duesel et al. | 261/77 |
| 2001/0013666 | A1 | * | 8/2001 | Nomura et al. | 261/93 |

* cited by examiner

*Primary Examiner* — Charles Bushey
(74) *Attorney, Agent, or Firm* — Matthias Scholl P.C.; Matthias Scholl

(57) ABSTRACT

A contact reaction tower, including: a central cylinder; and an outer cylinder. Lift pipes and a water inlet pipe(s) are installed in the central cylinder, reflux windows are formed on the wall of the central cylinder, and the water flow circulation between the central cylinder and the outer cylinder is realized through the lift pipes, the water inlet pipe(s), and the reflux windows, such that the water flow internal circulation of the whole contact reaction tower is realized. The contact reaction tower is sealed in its entirety from the outside environment, and a gas guide pipe is installed at the top of the contact reaction tower.

9 Claims, 1 Drawing Sheet

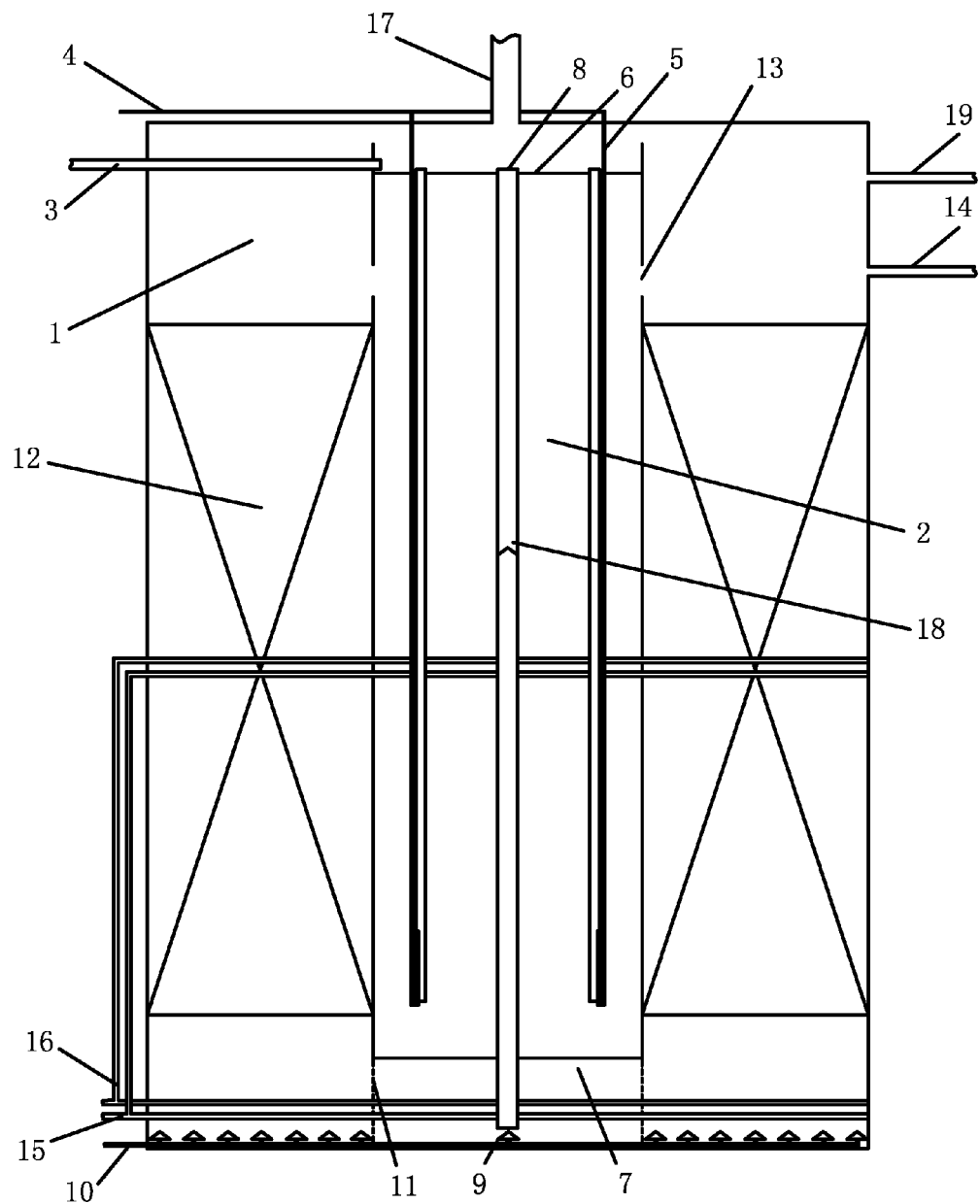

CONTACT REACTION TOWER

CROSS-REFERENCE TO RELATED APPLICATIONS

This application is a continuation-in-part of International Patent Application No. PCT/CN2010/080498 with an international filing date of Dec. 30, 2010, designating the United States, now pending, and further claims priority benefits to Chinese Patent Application No. 201010258204.7 filed Aug. 19, 2010. The contents of all of the aforementioned applications, including any intervening amendments thereto, are incorporated herein by reference.

BACKGROUND OF THE INVENTION

1. Field of the Invention

The invention relates to a contact reaction tower with internal-circulation ozone for advanced treatment of industrial wastewater.

2. Description of the Related Art

Ozone has the advantages of high reaction speed with organic matters, good reaction effect, no secondary pollution, easily obtained raw materials for production, and convenient use. Thus, it is more and more extensively applied in treatment of industrial wastewater.

The ozone used in water treatment is produced mainly by taking air as raw material. However, the ozone in ozonized air generated by an ozone generator only accounts for 0.6-1.2% (volume). According to the gas state equation and Dalton partial pressure law, the partial pressure of ozone is also 0.6-1.2% of pressure of ozonized air. When water temperature is 25° C., the ozonized air is added in water, and the solubility of ozone is only 3-7 mg/L. Therefore, sufficiently contacting the ozonized air with water, and improving the solubility of ozone as well as the air-water mixing efficiency is the key to enhance the ozonization effect.

The ozonized air for water treatment is in contact with and mixed with water in a special air-water mixing device for the completion of treatment of pollutants, and the contact area, time, ozone concentration, and pressure are decisive factors in mixing efficiency. At present, the ozone-water mixing method mainly includes: (1) an aeration method: this is a traditional, simple, and convenient method, microbubbles formed by ozone with a certain pressure using a microbubble diffuser are in sufficient contact with water, the smaller the bubbles, the greater the depth of water, and the longer the contact time, the better the effect will be; (2) a jet method: the flow speed is increased through the diameter alteration of a device during the flowing process of water in a pipe to form negative pressure suction, the introduced ozone is mixed with water in a pipeline, and the jet method has a high efficiency, however, the installation design and requirements is very strict; (3) a turbine negative suction method: an air passage is additionally arranged through the suction lift of a water pump, negative suction is formed during the water supply to enable the ozone to be introduced to water, the efficiency is high, the air flow control requires particular attention, and the water supply of the water pump will be affected when the air flow is high; (4) a reaction tower method: water is sprayed from a high place to form mist through a high tower, the ozonized air is diffused from a microbubble diffusion device arranged at the bottom of the tower to form rising microbubbles opposite to water flow, the ozonized air is in sufficient contact with water to form ozone water; packings can be involved in this method; the effect is good, but the cost is high, and the packings are easily blocked. In addition, other method for improving the solubility of ozone in water is disclosed in the prior art, for example, developing a machine for making high-concentration ozone water, combining a jet device and a spray nozzle, or using a high-concentration ozone water generation system. However, these methods are not suitable for treatment of industrial wastewater with high flow.

SUMMARY OF THE INVENTION

The invention provides a contact reaction tower with internal-circulation ozone for advanced treatment of industrial wastewater. Using the contact reaction tower, the problems of low solubility of ozone in water, low mixing efficiency of the conventional air-water mixing device, large fluctuation of water quality of industrial wastewater and blocking of packings can be solved, and dissolved oxygen can be provided for the subsequent aerobic biochemical treatment.

Working principle of the contact reaction tower: effluent internal circulation is formed through air lift, the water flow turbulence is increased, and the reaction tower is in good turbulent condition. The contact time between the wastewater and ozonized air is prolonged through the counter-flow contact between the ozonized air and wastewater in a water inlet pipe as well as the mixed contact between the ozonized air and wastewater in a packing area, so that the solubility of ozone in water is improved, and the sufficient contact and mixing of air and water are realized. According to the characteristic of large fluctuation of water quality of industrial wastewater, the effluent internal circulation can enhance the anti-shock loading capacity of the reaction tower, and ensure the water quality of effluent and the easily controlled water quality of effluent; aiming at the problem that the packings are easily blocked during the treatment of industrial wastewater, an air-water device for flushing packings is arranged, and the packings are flushed periodically, so as to ensure the air-water mixing efficiency; the preaeration can be carried out through air lift, thereby improving the concentration of dissolved oxygen in wastewater and facilitating the subsequent aerobic biochemical treatment.

To achieve the above objective, in accordance with one embodiment of the invention, there provided is a contact reaction tower for advanced treatment of industrial wastewater, comprising a central cylinder and an outer cylinder, wherein lift pipes and a water inlet pipe(s) are installed in the central cylinder, reflux windows are formed on the wall of the central cylinder, and the water flow circulation between the central cylinder and the outer cylinder is realized through the lift pipes, the water inlet pipe(s), and the reflux windows, so that the water flow internal circulation of the whole contact reaction tower is realized; the whole contact reaction tower is sealed, and a gas guide pipe is installed at the top of the contact reaction tower.

In a class of this embodiment, the central cylinder is sealed at the top and bottom, and 2-4 lift pipes and 1-2 water inlet pipes are arranged in the central cylinder; the lift pipes are installed in the central cylinder, a first opening at the upper end is formed on a top cover of the central cylinder, a second opening at the lower end is a certain distance away from the upper part of a bottom plate of the central cylinder, a microporous aerator pipe is installed in the lift pipes, and the water flow in the central cylinder is promoted through aeration; the water inlet pipe penetrates the whole central cylinder, that is, an upper opening is formed on the top cover of the central cylinder, and a lower opening is formed below the bottom plate of the central cylinder; a perforated water distribution wall is arranged at the part below the bottom plate of the central cylinder, the water output from the water inlet pipe enters the outer cylinder via the water distribution wall, and a microporous diffuser is arranged below the water inlet pipe for releasing ozonized air entering the water inlet pipe from bottom to top; a check valve is installed at the lower part of the water inlet pipe, and water only can flow down from up without flowing upwards from down, so as to prevent the air and water from flowing into the water inlet pipe during the flushing process; 2-4 reflux windows are formed at the position where the upper part of the wall of the central cylinder is higher than an packing area of the outer cylinder.

In a class of this embodiment, the packing area is arranged in the outer cylinder, the packings in the packing area includes but are not limited to pall rings, and are placed on a bearing plate at the bottom of the packing area, holes are evenly formed on the bearing plate, and a screen is arranged at the upper part of the packing area, so as to prevent the packings from flowing out along with water; a microporous diffuser for releasing ozonized air, a perforated air distribution pipe for flushing, and a perforated water distribution pipe for flushing are arranged below the packing area, and a flushing drain pipe is arranged at the top of the contact reaction tower.

In a class of this embodiment, a length of the gas guide pipe installed at the top of the contact reaction tower exceeds 5 m.

In a class of this embodiment, the contact reaction tower has a ratio of height to diameter between 7 and 10, and a ratio of an inner diameter thereof to an inner diameter of the central cylinder between 2 and 3.

In the reaction tower, the effluent internal circulation is formed through air lift, the internal-circulation effluent and influent enter the reaction tower from the water inlet pipe in the central cylinder from up to down, and the ozonized air is released via the microporous diffuser below the water inlet pipe and in preliminary counter-flow contact with influent from down to up. The influent flows out from the water inlet pipe to the outer cylinder of the reaction tower. The microporous diffuser is arranged at the bottom of the outer cylinder for releasing ozonized air, air and water upwardly flow through the packing area in the outer cylinder. Thus, good turbulent condition is formed at a higher up-flow velocity, and the ozonized air can be fully dissolved, so that air is in sufficient contact with water and reacts with water. After the air and water flow through the packing area, part of the effluent enters the central cylinder from the reflux window on the central cylinder to form internal circulation through air lift, the rest effluent flows out of the reaction tower. Thus, a cyclical operation is completed. When the concentration of influent pollutants is high, the internal circulation amount can be increased to reduce the shock load to the reaction tower, the reaction time is prolonged within a short period, and thus the water quality of effluent is ensured. Flushing devices are arranged below and in the middle of the packing area for periodical flushing, so as to prevent the packing area from being blocked to affect the air-water mixing efficiency. In addition, the air lift also plays the role of preaeration, thereby improving the concentration of dissolved oxygen in water and facilitating the subsequent aerobic biochemical treatment.

Advantages of the invention are summarized below. The water flow turbulence can be increased through the effluent internal circulation of the reaction tower, the reaction tower is in good turbulent condition, and the contact time between the wastewater and ozonized air is prolonged through the counter-flow contact between the ozonized air and wastewater in a water inlet pipe as well as the mixed contact between the ozonized air and wastewater in a packing area, so that the solubility of ozone in water is improved, and the sufficient contact and mixing of air and water are realized; under the action of effluent internal circulation, the anti-shock loading capacity can also be enhanced, and the water quality of effluent is ensured and easily controlled; the air-water device for flushing packings can be used for periodically flushing packings, so as to ensure the air-water mixing efficiency; the preaeration can also be carried out through air lift, thereby improving the concentration of dissolved oxygen in water and facilitating the subsequent aerobic biochemical treatment.

BRIEF DESCRIPTION OF THE DRAWINGS

The invention is described hereinbelow with reference to accompanying drawings, in which the sole FIGURE is a structural diagram of a contact reaction tower with internal-circulation ozone.

In the drawings, the following reference numbers are used: 1. outer cylinder; 2. central cylinder; 3. main water inlet pipe; 4. air pipe; 5. lift pipe; 6. top cover; 7. bottom plate; 8. water inlet pipe; 9. microporous diffuser; 10. air inlet pipe; 11. perforated water distribution wall; 12. packing area; 13. reflux window; 14. main water outlet pipe; 15. air distribution device; 16. water distribution device; 17. gas guide pipe; 18. check valve; 19. flushing drain pipe.

DETAILED DESCRIPTION OF THE EMBODIMENTS

In a contact reaction tower with internal-circulation ozone for advanced treatment of industrial wastewater, the water in a central cylinder 2 enters a lift pipe 5 under the action of aeration lift of an air pipe 4, flows out from an opening at the upper end of the lift pipe 5, then enters a water inlet pipe 8 of the central cylinder together with the water input from a main water inlet pipe 3 of the reaction tower, and then flows into the reaction tower from up to down. The ozonized air is released via a microporous diffuser 9 below the water inlet pipe 8 of the central cylinder and is in preliminary counter-flow contact with influent from down to up; then the influent flows out from the water inlet pipe 8 of the central cylinder, and flows to an outer cylinder 1 of the reaction tower through the perforated water distribution wall 11, the ozonized air enters from an air inlet pipe 10 and is released through the microporous diffuser 9, air and water upwardly flow through a packing area 12 in the outer cylinder 1, the good turbulent condition can be formed at a higher up-flow velocity, the ozonized air can be fully dissolved, so that air is in sufficient contact with water and reacts with water; after air and water flow through the packing area 12, part of the effluent enters the central cylinder 2 from a reflux window 13 on the central cylinder 2 to form internal circulation through air lift, the rest effluent flows out of the reaction tower from a main water outlet pipe 14 of the reaction tower, the residual ozone is discharged to the atmosphere through a gas guide pipe 17, and thus a cyclical operation is completed. When the concentration of influent pollutants is high, the internal circulation amount can be increased by increasing the air quantity to reduce the shock load to the reaction tower, the reaction time is prolonged within a short period, and the water quality of effluent is ensured. An air distribution device 15 for flushing packings and a water distribution device 16 for flushing packings are arranged below and in the middle of the packing area respectively, so as to prevent the packing area from being blocked to affect the air-water mixing efficiency, a check valve 18 in the main water inlet pipe 3 of the reaction tower can prevent the air and water from entering to affect the flushing effect during the flushing process. The drain pipe is closed during the flushing process, and the flushing water is drained via a flushing drain pipe 19. The basic structure of a contact reaction tower with internal-circulation ozone used in the following examples is described as above.

EXAMPLE 1

A contact reaction tower with internal-circulation ozone made of stainless steel is established in a vitamin C factory. The reaction tower is 1.5 m in inner diameter and 9 m in height, the central cylinder is 0.6 m in inner diameter and 8 m in height, the distance from the top cover 6 of the central cylinder to the top cover of the reaction tower is 0.4 m, and the distance from the bottom plate 7 of the central cylinder to the bottom of the reaction tower is 0.6 m. Two lift pipes with inner diameter of 52 mm are arranged in the central cylinder, a microporous aerator pipe is installed in each lift pipe, a water inlet pipe with inner diameter of 200 mm is arranged in the center of the central cylinder and 0.2 m away from the bottom of the reaction tower, and a microporous aerator is installed below the water inlet pipe. The height of the perforated water distribution wall is 0.6 m, the aperture of the holes formed on the perforated water distribution wall is 20 mm, and the space between the holes is 50 mm. A microporous aerator is installed at the bottom of the outer cylinder of the reaction tower. The packings in the packing area adopt pall rings, the height of the packing area is 6.5 m, the bottom end of the packing area is 1 m away from the bottom of the reaction tower, and the top end of the packing area is 1.5 away from the top of the reaction tower. An air distribution device for flushing packings and a water distribution device for flushing packings are arranged at the positions 0.4 m and 0.2 m below the bottom end of the packing area, respectively, and an air distribution device for flushing packings and a water distribution device for flushing packings are also arranged in the middle of the packing area respectively. Two reflux windows are arranged at the position where the upper part of the central cylinder is 0.8 away from the top end of the packing area, and water outlet pipes are arranged on the outer cylinder and at the equal altitude of the reflux window. A gas guide pipe with length of 5 m is arranged at the center of the tower top, and the active volume of the whole reaction tower is about 5 m$^3$.

The effluent in a secondary sedimentation tank of the vitamin C factory is used as influent of the contact reaction tower with internal-circulation ozone, the flow rate is 10 m/h, and the hydraulic retention time is about 30 min. The water quality of influent is as follows: CODcr is 280 mg/L, and chroma is 300 times. When the addition of ozone is 200 mg/L, the water quality of the treated effluent is as follows: CODcr is 160 mg/L, and chroma is 80 times. Under the same conditions, an ordinary ozone reaction tower is adopted, and the water quality of effluent is as follows: CODcr is 190 mg/L, and chroma is 120 times. Obviously, the contact reaction tower with internal-circulation ozone is good in air-water mixing effect, high in solubility of ozone and sufficient in reaction, thus the treatment effect is better than that of an ordinary ozone contact reaction tower.

In addition, the concentration of dissolved oxygen in the effluent is 1-2 mg/L through measurement, so as to facilitate the decarbonization and nitrogen removal in the subsequent aerobic biochemical treatment process (such as an MBBR (Moving Bed Biofilm Reactor), a biological aerated filter, etc.). During the operating process, it is found that there is still a lot of suspended matter after the effluent in the secondary sedimentation tank is filtered through a fiber ball, the packings will be blocked after several days to lead to reduced treatment effect, and if air and water are used for flushing at the moment, the treatment effect will be restored.

EXAMPLE 2

Effluent in a secondary sedimentation tank of a vitamin $B_{12}$ factory is used as influent of the contact reaction tower with internal-circulation ozone of Example 1, the flow rate is 7 m/h, and the hydraulic retention time is about 45 min. The water quality of influent is as follows: CODcr is 420 mg/L, and chroma is 700 times. When the addition of ozone is 300 mg/L, the water quality of the treated effluent is as follows: CODcr is 260 mg/L, and chroma is 150 times. Under the same conditions, an ordinary ozone reaction tower is adopted, and the water quality of effluent is as follows: CODcr is 310 mg/L, and chroma is 280 times.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A contact reaction tower, comprising:
   a) a central cylinder; and
   b) an outer cylinder;
wherein
   lift pipes and a water inlet pipe(s) are installed in the central cylinder;
   reflux windows are formed on a wall of the central cylinder;
   water flow circulation between the central cylinder and the outer cylinder is realized through the lift pipes, the water inlet pipe(s), and the reflux windows, so that the water flow internal circulation of the whole contact reaction tower is realized;
   the contact reaction tower is sealed; and
   a gas guide pipe is installed at the top of the contact reaction tower.

2. The contact reaction tower of claim 1, wherein
   the central cylinder is sealed at the top and bottom;
   2-4 lift pipes and 1-2 water inlet pipes are arranged in the central cylinder;
   an upper opening of each lift pipe is formed on a top cover of the central cylinder, and a lower opening of each lift pipe is disposed at an upper part of the central cylinder;
   a microporous aerator pipe is installed in each lift pipe;
   an upper opening of the water inlet pipe is formed on the top cover of the central cylinder, and a lower opening of the water inlet pipe is formed below a bottom plate of the central cylinder;
   a perforated water distribution wall is arranged below the bottom plate of the central cylinder;
   a microporous diffuser is arranged below the water inlet pipe;
   a check valve is installed at the lower part of the water inlet pipe; and
   a plurality of reflux windows are formed at the wall of the central cylinder which is higher than a packing area of the outer cylinder.

3. The contact reaction tower of claim 2, wherein
   the packing area is arranged in the outer cylinder;
   packings in the packing area are pall rings, and are placed on a bearing plate at the bottom of the packing area;
   holes are evenly formed on the bearing plate, and a screen is arranged at the upper part of the packing area to prevent the packings from flowing out along with water;

a microporous diffuser for releasing ozonized air, a perforated air distribution pipe for flushing, and a perforated water distribution pipe for flushing are arranged below the packing area; and a flushing drain pipe is arranged at the top of the contact reaction tower.

4. The contact reaction tower of claim 1, wherein a length of the gas guide pipe installed at the top of the contact reaction tower exceeds 5 m.

5. The contact reaction tower of claim 2, wherein a length of the gas guide pipe installed at the top of the contact reaction tower exceeds 5 m.

6. The contact reaction tower of claim 3, wherein a length of the gas guide pipe installed at the top of the contact reaction tower exceeds 5 m.

7. The contact reaction tower of claim 1, having a ratio of height to diameter between 7 and 10, and a ratio of an inner diameter thereof to an inner diameter of the central cylinder between 2 and 3.

8. The contact reaction tower of claim 2, having a ratio of height to diameter between 7 and 10, and a ratio of an inner diameter thereof to an inner diameter of the central cylinder between 2 and 3.

9. The contact reaction tower of claim 3, having a ratio of height to diameter between 7 and 10, and a ratio of an inner diameter thereof to an inner diameter of the central cylinder between 2 and 3.

* * * * *